United States Patent
Shimada

(10) Patent No.: US 6,654,136 B2
(45) Date of Patent: *Nov. 25, 2003

(54) PRINTING WITH A PLURALITY OF PRINTERS

(75) Inventor: Naoki Shimada, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,512

(22) Filed: Feb. 22, 1999

(65) Prior Publication Data

US 2003/0038962 A1 Feb. 27, 2003

(30) Foreign Application Priority Data

Feb. 25, 1998 (JP) .......................... 10-043473

(51) Int. Cl.⁷ .......................... G06K 15/00; G06K 1/00
(52) U.S. Cl. ............... 358/1.15; 358/1.13; 358/1.4; 358/1.9; 358/1.1; 399/82; 399/1
(58) Field of Search ............... 358/1.15, 1.13, 358/1.1, 1.9, 1.4; 399/82, 1

(56) References Cited

U.S. PATENT DOCUMENTS

| 5,119,472 A | | 6/1992 | Ogawa | 395/111 |
|---|---|---|---|---|
| 5,287,194 A | * | 2/1994 | Lobiondo | 358/296 |
| 5,467,434 A | * | 11/1995 | Hower et al. | 358/1.15 |
| 5,574,831 A | * | 11/1996 | Grenda | 358/1.4 |
| 5,813,348 A | * | 9/1998 | Zingher | 358/1.14 |
| 5,859,711 A | * | 1/1999 | Barry et al. | 358/296 |
| 5,881,212 A | * | 3/1999 | Morita | 358/1.12 |
| 5,978,557 A | * | 11/1999 | Kato | 358/1.15 |
| 5,982,996 A | * | 11/1999 | Snyders | 358/1.14 |
| 5,995,721 A | * | 11/1999 | Rourke et al. | 358/1.15 |
| 5,995,723 A | * | 11/1999 | Sperry et al. | 358/1.15 |
| 6,031,631 A | * | 2/2000 | Tahara et al. | 358/296 |
| 6,148,164 A | * | 11/2000 | Shima | 399/82 |

FOREIGN PATENT DOCUMENTS

| JP | 5-073232 | 3/1993 |
|---|---|---|
| JP | 8-263240 | 10/1996 |
| WO | WO 97/06481 | 2/1997 |

* cited by examiner

*Primary Examiner*—Kimberly A. Williams
*Assistant Examiner*—Ashanti Ghee
(74) *Attorney, Agent, or Firm*—Fitzpatrick, Cella, Harper & Scinto

(57) ABSTRACT

It is an object to allow a plurality of printers to print a document without disordering a page order. When a plurality of printers are allowed to print the document, print data is transferred to the plurality of printers so as not to disorder the page order.

20 Claims, 15 Drawing Sheets

PRINTING WITH A PLURALITY OF PRINTERS

BACKGROUND OF THE INVENTION

1. Field of the Invention

The invention relates to an information processing apparatus, an information processing method, and a storage medium for allowing a plurality of printers to print.

2. Related Background Art

In recent years, a few kinds of printers using an ink jet system have been put into practical use. Those printers can perform a color print at a level near a photograph although they are relatively cheap and a high attractive document can be easily formed by anyone.

However, in the color printers of the ink jet system, a printing speed is equal to or less than 1/10 of that of a color laser beam printer.

This is because the ink jet type printer is a printer called a serial type. The serial type printer performs the print by a method whereby a print head emits ink to a predetermined width in the vertical direction while scanning in the lateral direction. After the print head scanned once in the lateral direction, a print sheet is fed by a predetermined amount in the vertical direction and the scan in the lateral direction is further performed. By repeating the above operations the number of times corresponding to one page of the print sheet, the print is finished.

On the other hand, the laser beam printer is called a page printer and the print of one page can be performed at once. Therefore, the print can be completed within an extremely shorter time than the ink jet printer.

When considering a point of costs, however, the color laser printer is an expensive apparatus that is 30 or more times as high as the color ink jet printer and it is impossible to readily use it by anyone. Even when comparing expendable supplies, there is a cost difference of 10 times or more.

Since the ink jet printer has the problem on the printing speed although it is cheap as mentioned above, a using method such that a plurality of printers are connected and the print is performed is considered.

However, if a document is merely printed by a plurality of printers, there is a fear such that a page order is disordered.

SUMMARY OF THE INVENTION

To solve the above problems, it is an object of the invention to provide an information processing apparatus, an information processing method, and a storage medium which enable a plurality of printers to print a document without disordering a page order.

Another object of the invention is to provide an information processing apparatus, an information processing method, and a storage medium which can print in a prefer print speed mode and a prefer page order mode by a designation of the user.

To accomplish the above object, according to the invention, there is provided an information processing apparatus comprising transfer means for transferring print data to a plurality of printers without disordering a page order when a document is printed by a plurality of printers.

According to the invention, there is provided an information processing method comprising a transfer step of transferring print data to a plurality of printers without disordering a page order when a document is printed by a plurality of printers.

According to the invention, there is provided a storage medium in which a program having a transfer step of transferring print data to a plurality of printers without disordering a page order when a document is printed by a plurality of printers has been stored.

DETAILED DESCRIPTION OF THE PREFERRED EMBODIMENT

An embodiment of the invention will now be described hereinbelow with reference to the drawings.

Figure 1:
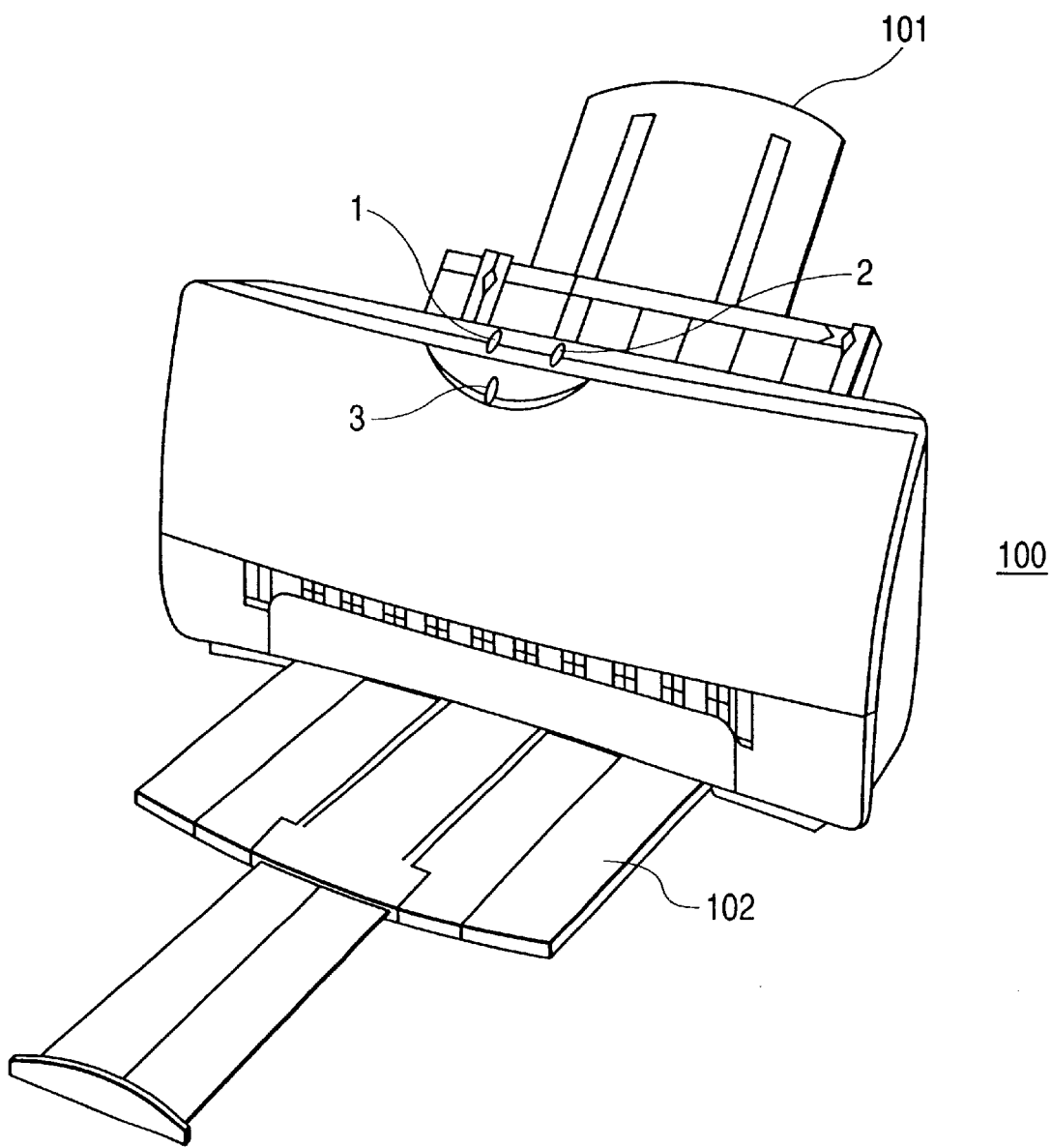
FIG. 1 is a front view of a printer embodying the invention.

FIG. 1 is a front view of a printer 100 having a printing mechanism by an ink jet embodying the invention. Reference numeral 1 denotes a power switch; 2 a reset switch to recover from a fault in which a non-paper error or the like occurs; and 3 an LED which is lit on in green when a power source is turned on and is lit on in orange when an error occurs. When print data is received and a print is performed, the LED 3 flickers, thereby showing different operations.

Figure 2:
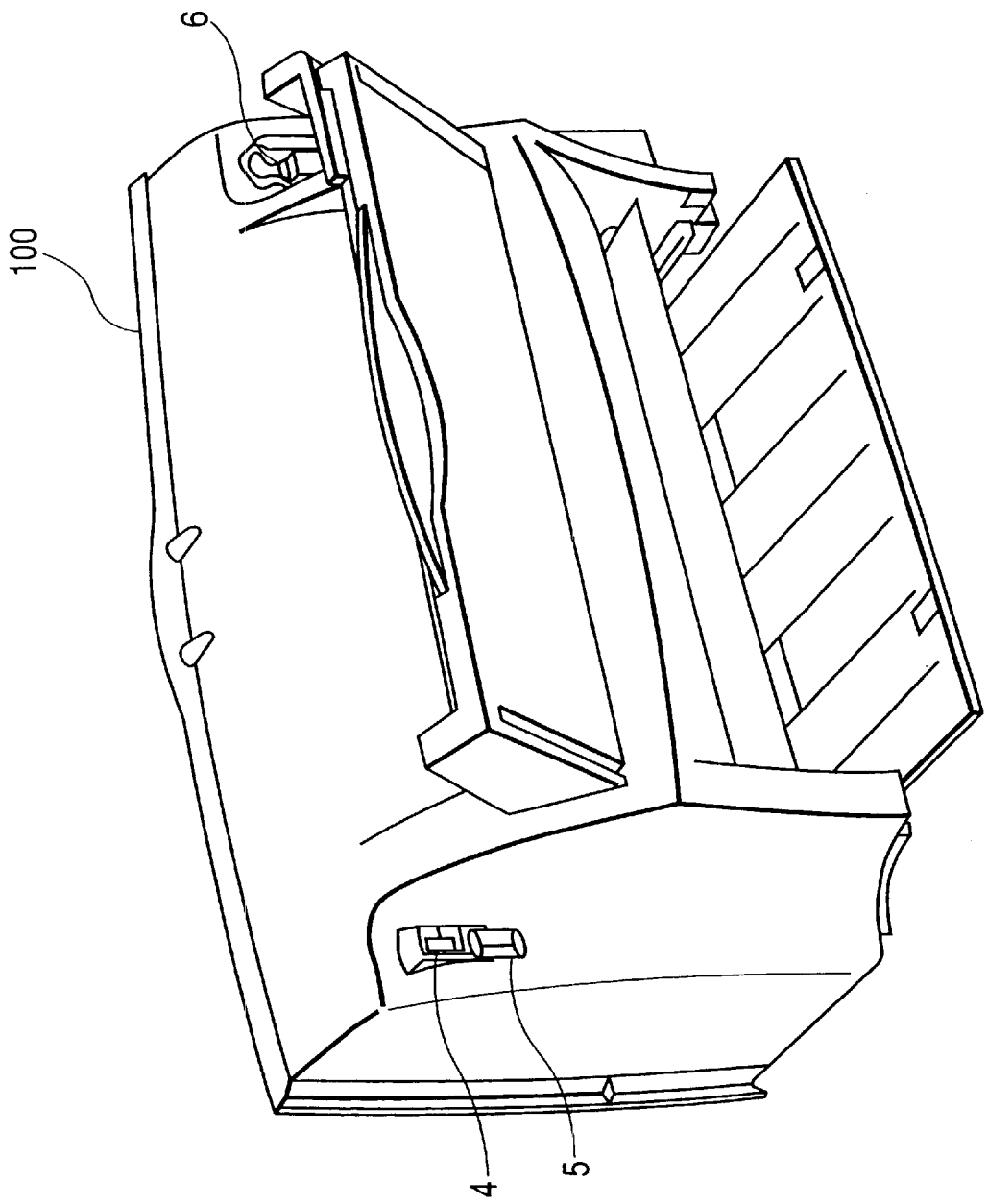
FIG. 2 is a rear view of the printer.

FIG. 2 is a rear view. Reference numeral 4 denotes a connecting portion of an A-type connector of the USB (Universal Serial Bus); 5 a connecting portion of a B-type connector; and 6 a connector of the Centronics type. Since the standard of the USB is not directly related to the essence of the present invention, its detailed description is omitted. The standard of the USB is written in detail in "The Universal Serial Bus Specification", Version 1.0, (Jan. 19, 1996). The interface portion of the Centronics type confirms with IEEE 1284. Similarly, since the IEEE 1284 standard itself is not directly concerned with the present invention, its detailed description is omitted here.

Figure 3:
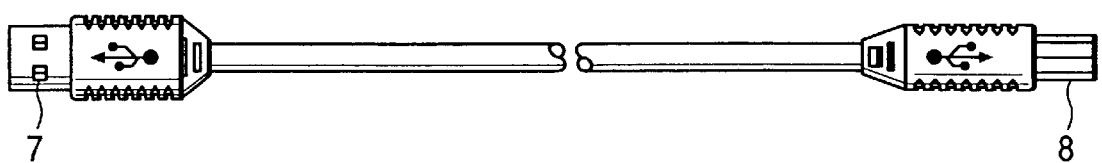
FIG. 3 is an external view of a cable of a USB as an interface of the printer.

FIG. 3 is an external view of a USB cable. Reference numeral 7 denotes a connector of the A type and 8 indicates a connector of the B type.

Figure 4:
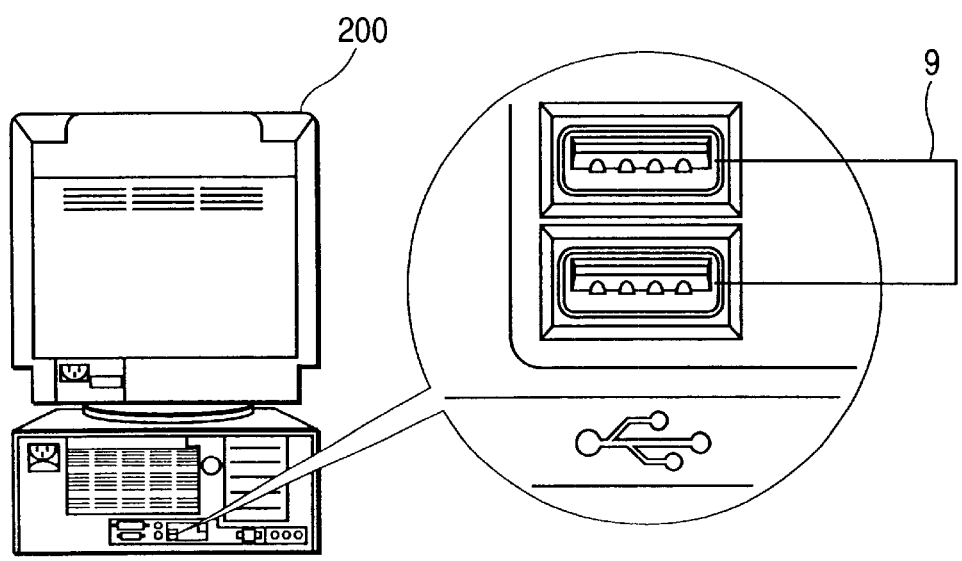
FIG. 4 is a diagram of an USB connector arranged on the rear surface of a personal computer.
Figure 5:
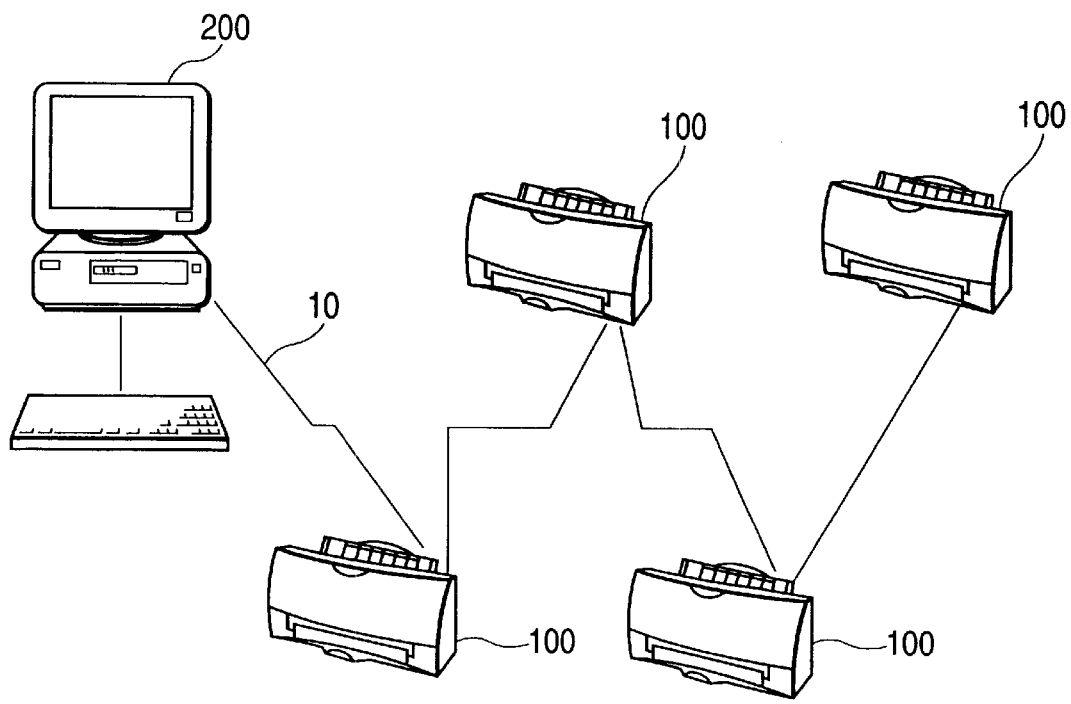
FIG. 5 is a diagram showing an image in which four printers are cascade connected.

The printer of FIG. 1 is connected to a personal computer 200 of FIG. 4 by using the USB cable of FIG. 3. FIG. 4 is a rear view of the personal computer. Reference numeral 9 in FIG. 4 denotes an example in which the connectors of the A type of the USB are attached to two upper and lower stages. The connector 7 in FIG. 3 is connected to one of the connectors 9 in FIG. 4. The connector 8 in FIG. 3 is connected to the connecting portion 5 in FIG. 2. Similarly, an A-type connector of another USB cable can be connected to the connecting portion 4 in FIG. 2 and a B-type connector of the same cable can be also connected to another printer of the same type. FIG. 5 shows such a state. In FIG. 5, reference numeral 10 denotes a USB connection. As shown in FIG. 5, the USB can cascade connect a plurality of printers to one personal computer. Each of the cascade connected printers can substantially independently operate without mutually being influenced. The number of printers which can be connected is up to four.

Figure 6:
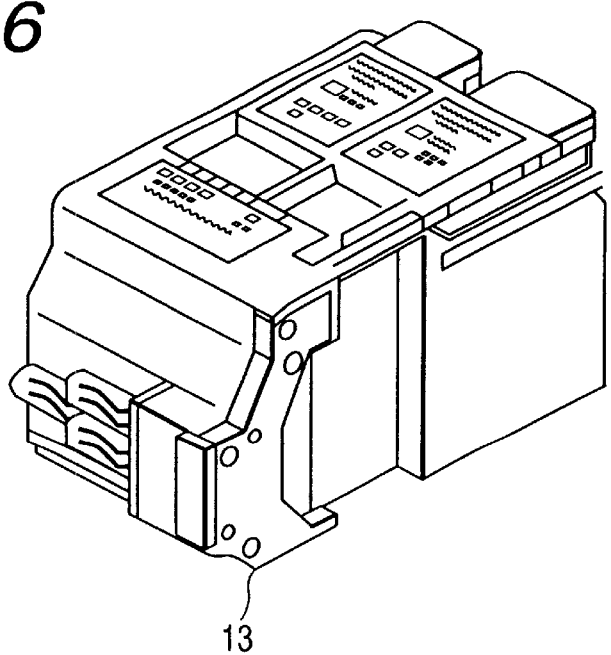
FIG. 6 is an external view of a cartridge which can be attached into the printer.

In the printer of FIG. 1, a cartridge for printing can be exchanged. Therefore, it is possible to print by attaching an optimum cartridge according to the contents to be printed and the object to the printer. FIG. 6 shows various print cartridges which can be attached to the printer of FIG. 1.

Reference numeral 13 in FIG. 6 denotes a print cartridge constructed by four colors of cyan, magenta, yellow, and black. By using this print cartridge for a general color print, an optimum result can be obtained. This cartridge can be attached and detached to/from the printer of FIG. 1 embodying the invention. An attaching/detaching method is shown in FIGS. 7A to 7C.

Figure 7A:
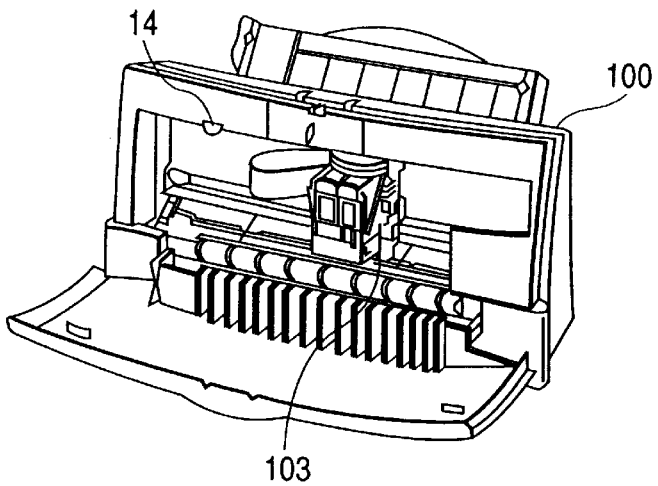
FIGS. 7A, 7B and 7C are diagrams showing an attaching and detaching method of the cartridge.
Figure 7B:
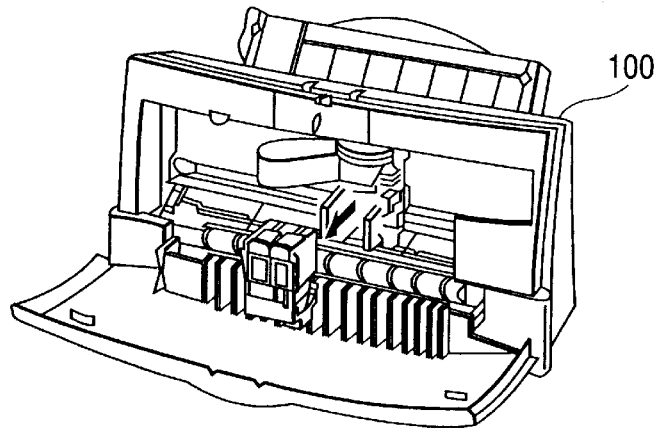
Figure 7C:
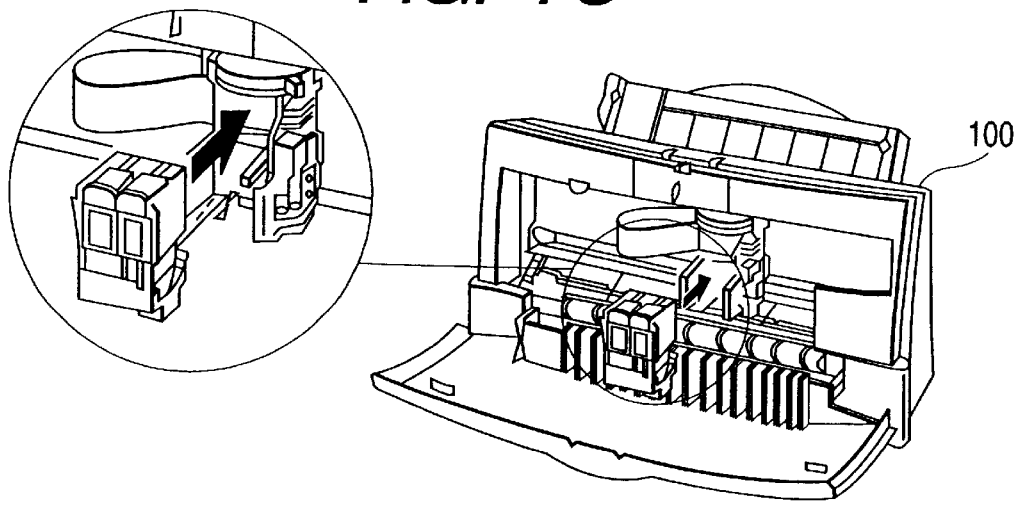

Reference numeral 14 in FIG. 7A denotes a cartridge exchange switch. By pressing this switch, the cartridge is moved toward the center of a carriage, thereby enabling the cartridge to be easily exchanged. FIG. 7B is a diagram showing a case of removing the cartridge. FIG. 7C is a diagram showing a state where the cartridge is attached. A diagram surrounded by a circle enlargedly shows a state where the cartridge is attached.

Figure 8:
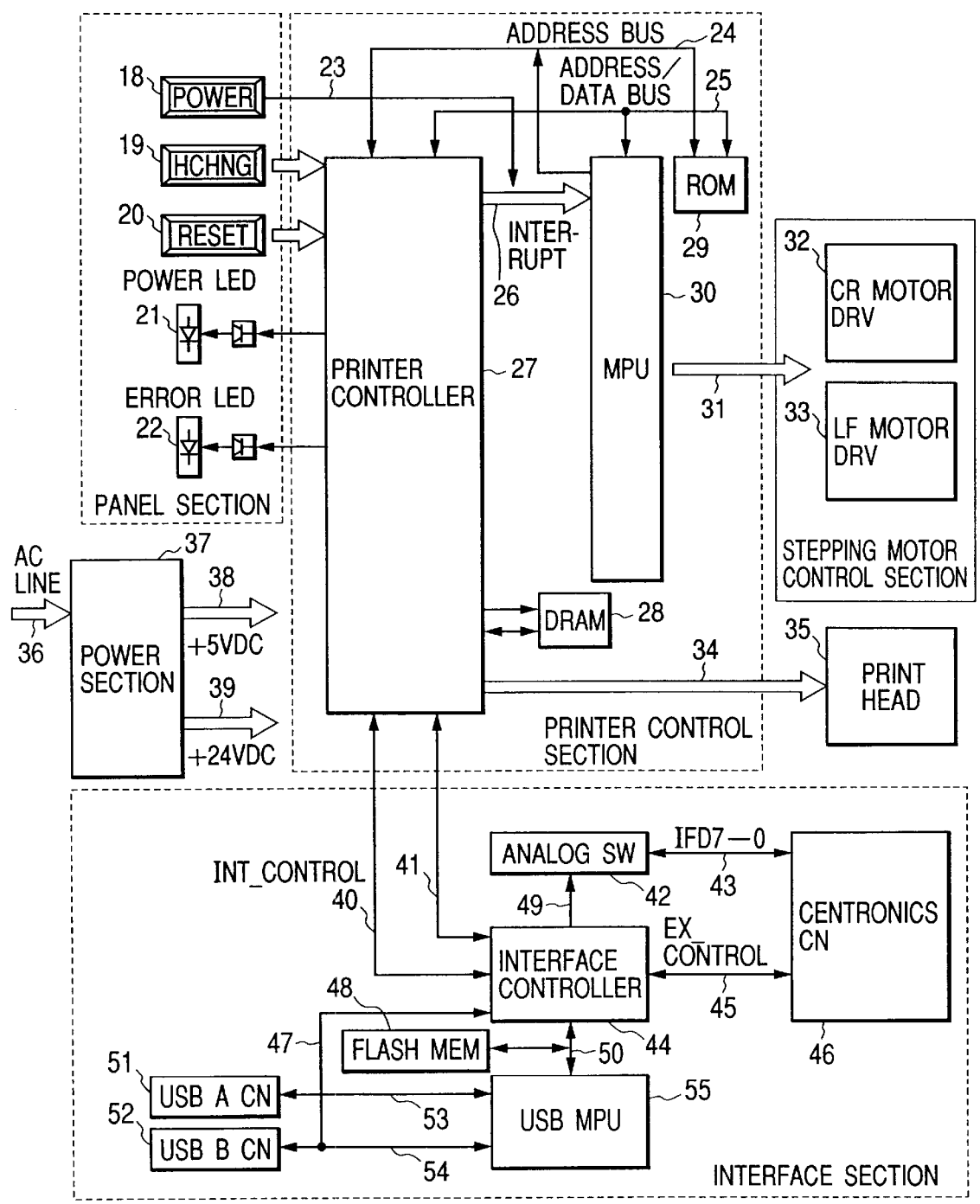
FIG. 8 is a block diagram of an electric circuit of the printer.

FIG. 8 is a block diagram of the printer 100 of FIG. 1 embodying the invention. In FIG. 8, reference numeral 18 denotes a power switch corresponding to the power switch 1 in FIG. 1; 19 a cartridge exchange switch corresponding to the cartridge exchange switch 14 in FIG. 7; 20 a reset switch corresponding to the reset switch 2 in FIG. 1; 21 an LED which is lit on in green at the time of turn-on of the power source and corresponds to the LED 3 in FIG. 1; and 22 an LED which is lit on in orange at the time of occurrence of an error and likewise corresponds to the LED 3 in FIG. 1. The LED solely can be lit on in two colors of green and orange. In FIG. 8, reference numeral 23 denotes a signal line for transferring a signal indicative of the operation of the power switch 18 in FIG. 8 to an MPU 30 in FIG. 8. Since this signal is transmitted to the MPU 30 in FIG. 8 as an interrupt signal 26 in FIG. 8, it is preferentially processed in the MPU 30. In FIG. 8, reference numerals 24 and 25 denote an address bus and a data bus, respectively, for connecting a printer controller (printer control gate array) 27 in FIG. 8, the MPU 30, and an ROM 29. Programs describing the operation and processes of the MPU have been recorded in the ROM 29. In FIG. 8, the printer controller 27 has control functions such as switch, LED, interface, memory, and the like. In FIG. 8, reference number 28 denotes an RAM for providing a memory area to temporarily store data or the like when the MPU 30 in FIG. 8 executes processes; 31 a signal line for transmitting a signal to control a stepping motor control section of stepping motors 32 and 33 in FIG. 8; 32 a carriage motor for moving a carriage 103 in FIG. 7 as a supporting member of the ink cartridge to the right and left when it is seen from the front direction of FIG. 1; and 33 a feed motor for feeding a print sheet. The print sheets are enclosed on a print sheet tray 101 in FIG. 1 and are ejected to a print sheet tray 102 through the inside of the printer. The movement of the print sheet is performed by the feed motor 33. In FIG. 8, reference numeral 35 denotes an ink cartridge shown in FIG. 6. The ink cartridge has a structure such that the ink itself and a head to emit the ink are integrated. An ID showing a type of ink cartridge itself has been also recorded in the ink cartridge. In FIG. 8, reference numeral 34 denotes a control line for controlling the head built in the ink cartridge 35 and reading out the ID.

In FIG. 8, reference numeral 36 denotes an AC line (commercially available power source) which is provided for general homes and 37 indicates an AC adapter for converting the AC power into +5 VDC 38 and +24 VDC 39 in FIG. 8. The power source of +5 VDC 38 is used for making electronic parts such as an MPU 30 and the like operative. The power source of +24 VDC 39 is used to drive the carriage motor 32 or the like and the head built in the ink cartridge 35.

In FIG. 8, reference numeral 40 denotes an interface control signal to connect an interface controller 44 to the printer controller 27. The I/F control signal 40 is used for allowing the printer controller 27 to detect an operating mode of the interface. Reference numeral 41 denotes a data bus for allowing the I/F controller 44 serving as an interface gate array to transmit data received from the personal computer to the printer controller 27. The I/F controller 44 switches data from a Centronics connector 46 and data from a USB MPU 55. This switching operation is performed by an analog switch 42. The I/F controller 44 is designed so as to always preferentially select the data from the USB MPU 55. That is, when the print data is sent to both of the Centronics interface 46 and a USB B-type connector 52, the USB side is always preferentially selected and the data from the Centronics side is not received.

This switching operation is performed by using statuses of a signal line 43 from a Centronics interface and a signal line 47. Reference numeral 45 denotes a data signal from the Centronics interface and 48 indicates a flash memory in which programs of the USB MPU 55 to control the USB interface have been stored. As already been mentioned, there are two types of USB of the A-type connector and B-type connector. A B-type connector 52 is connected to the personal computer or upstream equipment. The A-type connector 51 is connected to downstream equipment. Reference numerals 53 and 54 denote signal lines to the A-type connector 51 and B-type connector 52, respectively.

Figure 9:
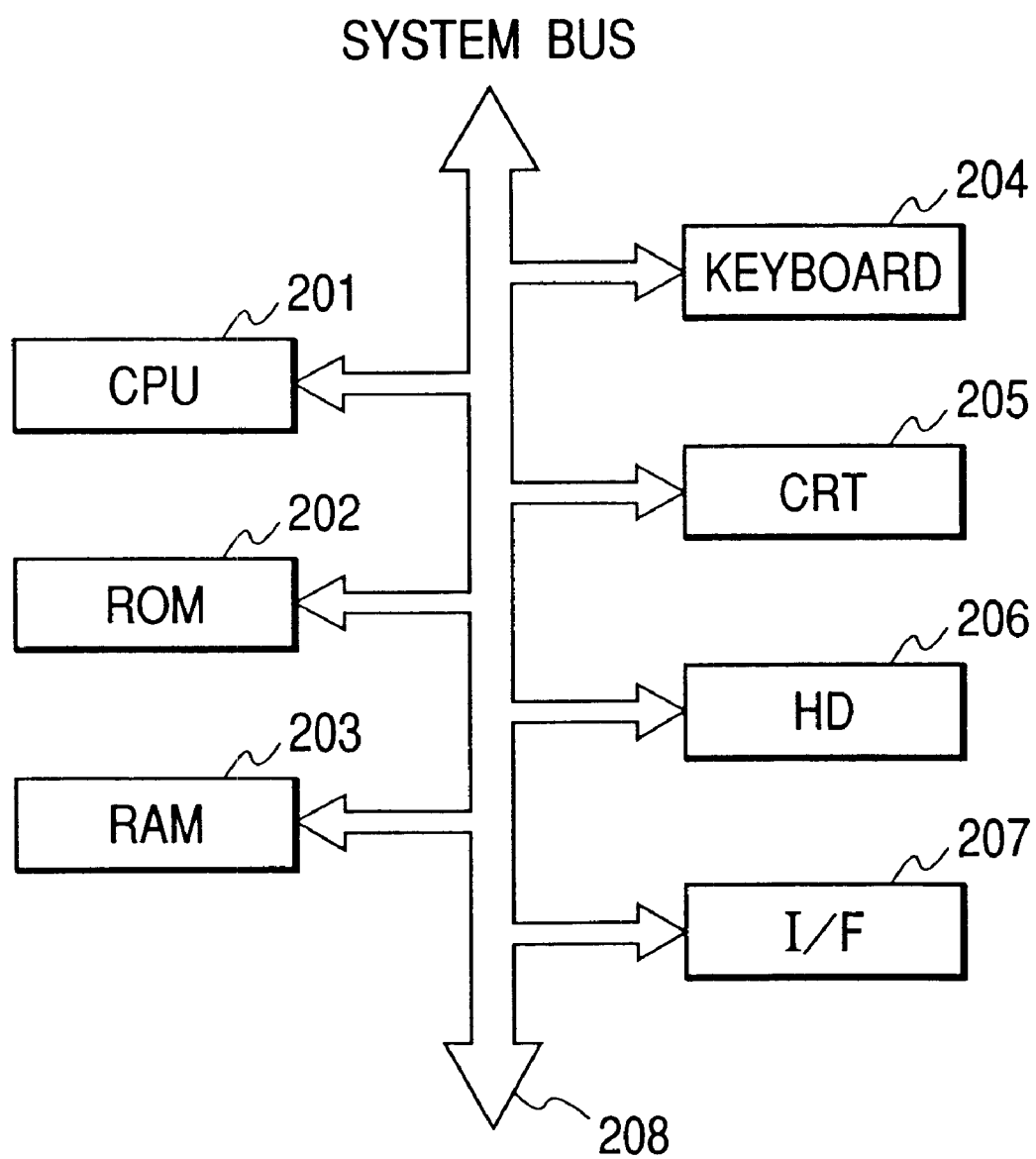
FIG. 9 is a block diagram showing a hardware construction of a personal computer.

FIG. 9 is a block diagram showing a hardware construction of the personal computer 200 in the embodiment of the invention.

In FIG. 9, reference numeral 201 denotes a CPU, namely, a central processing unit for performing a control of the whole computer apparatus, arithmetic operating processes, and the like; 202 an ROM, namely, a read only memory serving as a memory area to store information of a system activating program and the like; and 203 an RAM, namely, a random access memory serving as a data memory area in which there is no use limit. Programs for an operating system, an application, a device driver, a communication control, and the like are loaded into this data memory area and are executed. Reference numeral 204 denotes a keyboard section constructed by a keyboard, a mouse, and the like to input data; 205 a CRT section constructed by a display such as a CRT or the like and a display control unit to control display contents to the display; and 206 an HD section constructed by a hard disk and a disk control unit to control the hard disk. Programs such as a printer driver program regarding flowcharts, which will be explained hereinlater, and the like and various data such as fonts and the like are stored in the hard disk. The HD section 206 is referred or is loaded into the RAM as necessary upon execution. Reference numeral 207 denotes an interface section for performing a communication control with an external apparatus such as a printer or the like by the USB in the embodiment. Reference numeral 208 denotes a system bus serving as a path of data among the foregoing component elements.

A printing mechanism of "Windows 95" of Microsoft Co., Ltd., which is the operating system (hereinafter, abbreviated to an "OS") to execute the printer driver of the personal computer 200, will now be simply described. Reference numeral 56 in FIG. 10 denotes an application. The user executes a work such as an edition or the like of the document by the application 56. The user instructs the application 56 to execute the print of the formed document. The print is instructed by designating the printer to print from the application. FIG. 11 shows a state of the picture plane to be instructed. A name of the printer to be used is shown at 76 in FIG. 11.

By designating the printer, information regarding the characteristics of the printer is sent to a GDI (57 in FIG. 10) as a drawing process of the OS. Specifically speaking, there are the information about whether a color print is possible or not, a size of sheet which is used to print, and the like. The GDI 57 draws the document on the basis of those information. A result of the drawing of the GDI 57 is a format that is peculiar to the OS and this format can be used not only to print but also to display onto a CRT monitor or the like.

An output result of the GDI 57 is inputted to a printer driver 59. The printer driver is peculiar to each type of the printer to be used and is usually provided by a printer manufacturer and the OS vender does not provide it. The printer driver 59 converts the output from the GDI 57 so as to be optimum to the characteristics of the ink which is used by the printer and print data to send them to the printer is further formed.

The processing routine is divided into two routines in accordance with a printing method. One of the two processing routines is a method of intervening a first spooler 60 in FIG. 10 and the other is a method of not intervening the first spooler.

The method of not intervening the first spooler will be first explained. The print data formed by the printer driver 59 is sent to a GDI32 62. The GDI32 62 is an interface-like module of the spooler process and the printer driver 59. This is because the printer driver 59 is a 16-bit application and a spooler process 63 is a 32-bit application. Generally, the 16-bit application cannot directly access the 32-bit application. Therefore, the GDI32 62 having both of a portion which is accessed from the driver for the 16-bit application and a portion which is accessed from the driver for the 32-bit application is necessary.

The print data sent from the spooler process 63 via the GDI32 62 is once recorded into a second spooler 65. After completion of the spooling of the print data, the spooler process 63 reads out the print data from the second spooler 65 and sends it to a language monitor 69. The language monitor 69 has a function to detect a status of the printer, for example, a status such that the print data cannot be received due to a cause such as an absence of the print sheet or the like and to notify the user of a detected status as necessary or a function as a gate to control the start and stop of the transmission of the print data to the printer.

Since the printer embodying the invention uses the USB as an interface, the language monitor 69 sends the print data to a USB port of the personal computer. Since the port itself is hardware, a module to directly control the port is executed by Ring 0 called a privilege mode instead of Ring 3 by which the printer driver is executed. Since the application and module on the Ring 3 side cannot directly access to the module on the Ring 0 side, a USB port of the hardware of USB 75 is virtualized for the module existing in Ring 3, thereby constructing a USB port monitor 70. By accessing to the USB port monitor 70, the module on the Ring 3 side can obtain a result that is equivalent to that obtained by directly accessing to the hardware. The USB port monitor 70 accesses to WIN32 API which is provided by an OS 71. This module is a module to mediate between Ring 3 and Ring 0.

A device driver of the hardware of USB 75 is provided from the OS vender. A USB common driver 74 is a module to directly control the hardware of USB. A USB printer driver 72 integrates a function which is provided by the USB common driver 74 and provides a function for the printer. The USB printer driver 72 transmits the print data sent via the WIN32 API 71 to the USB common driver 74, so that the print data finally arrives at the printer and is printed by the printer.

The printing method of intervening the first spooler 60 will now be described.

Figure 12:
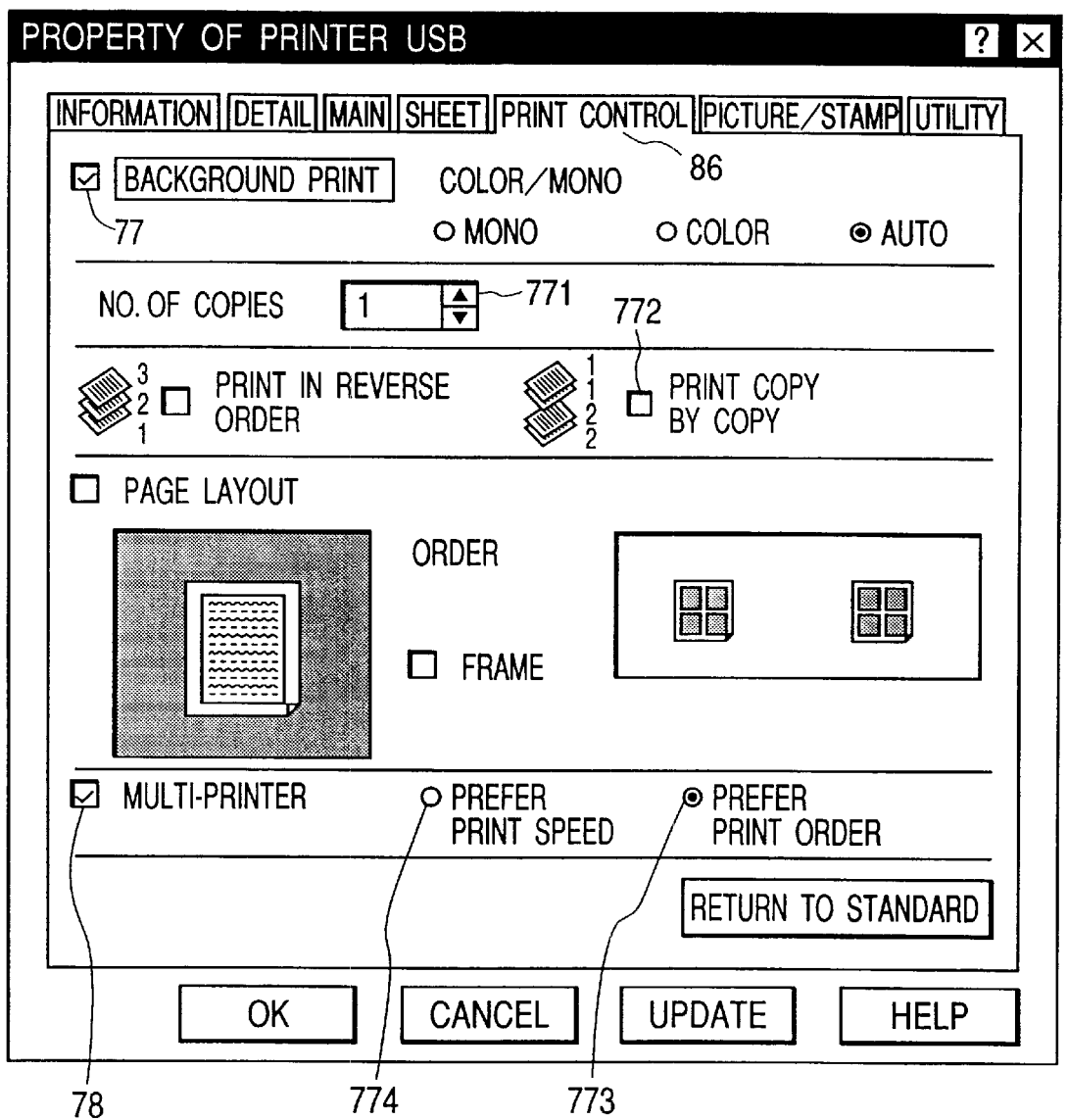
FIG. 12 is a diagram of items regarding a print control among the foregoing set items.

The printing method of intervening the first spooler is used in case of selecting a background print 77 in FIG. 12. By intervening the first spooler 60, the printing work in the application is finished earlier than the case where the first spooler is not intervened.

In a display method of a screen of FIG. 12, when a property button 761 in FIG. 11 is clicked by a mouse and a print control 86 is selected, an image is displayed on the screen as shown in FIG. 12.

The printer driver 59 sends the formed print data to the first spooler 60. Subsequently, when a multi-printer printing mode is not set, namely, when there is not a check mark in a check box 78 in FIG. 12, a back grounder 61 sends the spooled print data to the spooler process 63. The print data is sent to the printer designated by the printer USB 76 in FIG. 11 and is printed. The subsequent processes are substantially the same as those mentioned above.

When the multi-printer print 78 is set, the back grounder 61 reads out the print data from the first spooler 60 and transmits it to multi printer controller 66. The multi printer controller executes a work to divide the print data on a page unit basis in accordance with the number of usable printers in order to distribute the print data to a plurality of printers and to print. The divided print data is supplied to a USB output task 68 which is formed every allocated printer. For example, when there are four usable printers, four USB output tasks 68 are formed.

In the case where a check mark is set in a check box of the background print 77, the number of copies 771 can be set. The printer driver 59 forms one print data from the document. When a mode of a plurality of number of copies is set in 771, the back grounder 61 forms a plurality of print data as many as only the number of copies designated in 771 from one original print data and sends them to the spooler process 63 or multi printer controller 66.

The spooler process 63 is formed on a unit basis of the port to which the printer is connected. For example, if four printers are connected to USBPRNO1, USBPRNO2, USBPRNO3, and USBPRNO4, respectively, four spooler processes are also formed for the respective ports. Those denominations of the ports such as USBPRNO1 and the like are names which are conveniently allocated in order to distinguish the printers which are cascade connected as shown in FIG. 5. There is actually only one USB interface. Since a managing method of the printers in the OS is a method whereby one printer is connected to each port, a method of identifying the printer at the OS level as a sending destination of the print data is performed by using the port names.

The USB output task 68 sends the divided print data to the 63 spooler process formed every port. The subsequent processes are similar to those mentioned above.

Figure 10:
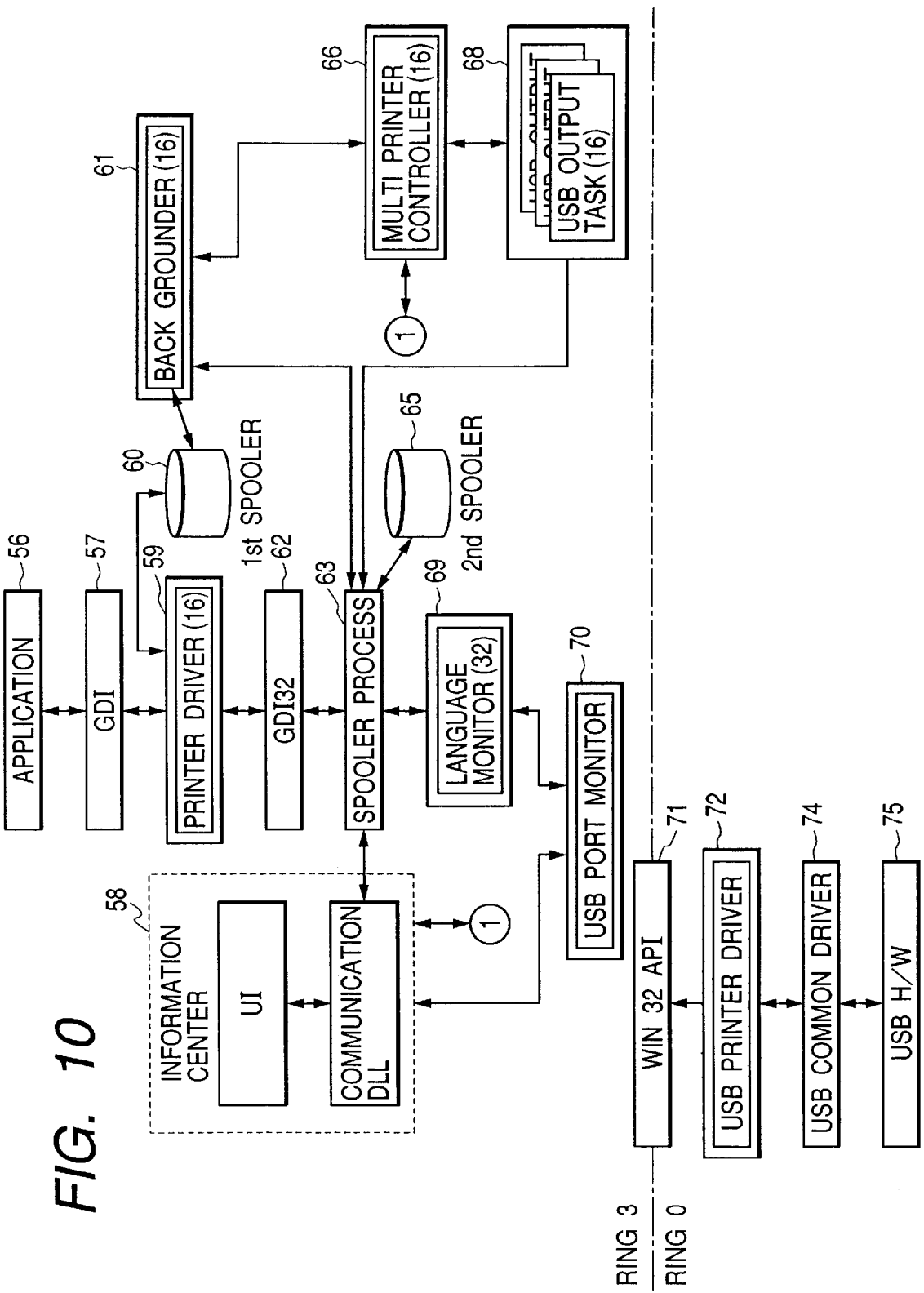
FIG. 10 is a block diagram of a printer driver formed for the printer of the invention.
Figure 11:
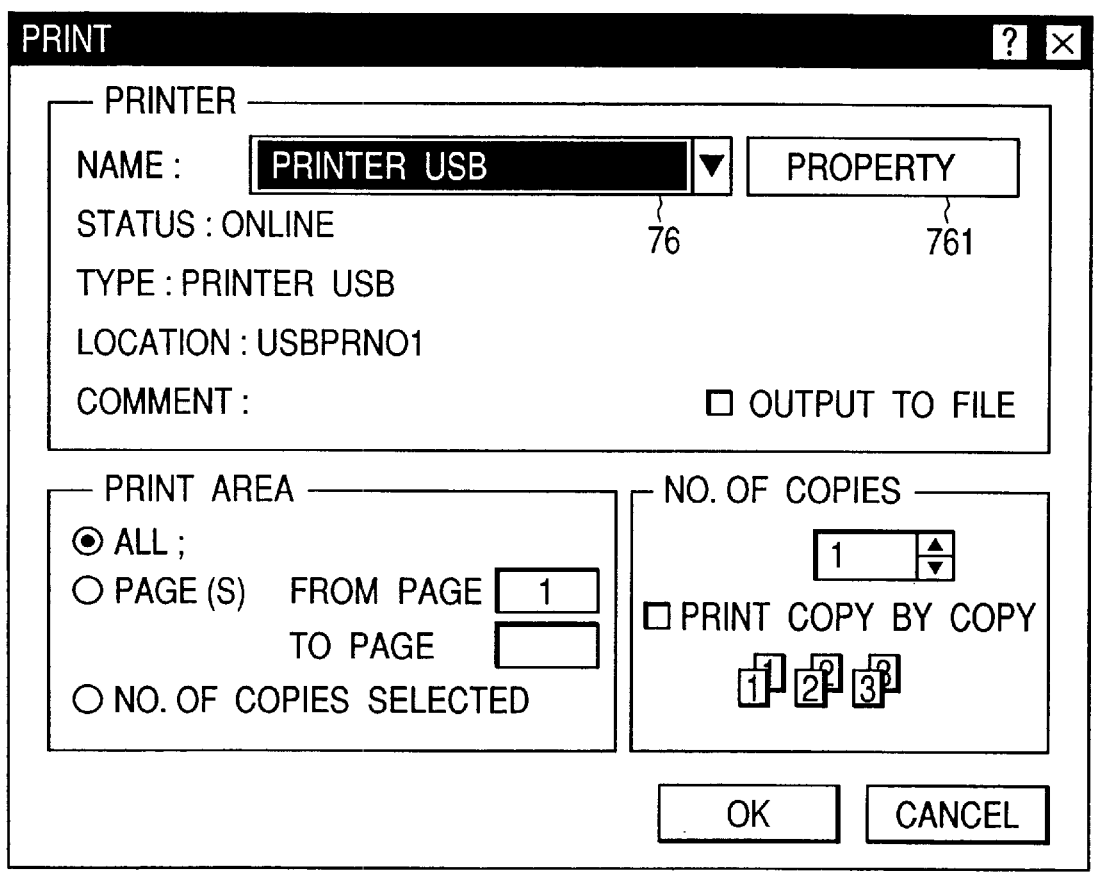
FIG. 11 is a diagram of a dialog which is displayed when printing from an application by using the foregoing printer driver.

FIG. 10 shows a case of printing by connecting four printers.

As already described above, although FIG. 10 shows the second spooler corresponding to 65, four spoolers are formed for the respective printers. Four spooler processes 63 are also formed. Similarly, four language monitors 69 each for performing processes according to the status of the printer are also formed.

As mentioned above, since there is substantially only one interface as a USB, the module such as a driver or the like regarding the USB is only one module irrespective of the number of printers which are connected.

A method of discriminating the usable printers by the multi printer controller 66 will now be described. Reference numeral 58 denotes an information center to collect the information regarding the connected printer. The information to be collected is a size of print data stored in the second spooler and an operating status (whether a situation such as an absence of the print sheet or the like which becomes an obstacle of the print does not occur or not) of the connected printer.

As a method of reading out the print data from the first spooler, there are a method whereby after all of the print data was stored into the first spooler, they are read out and a method whereby at a time point when a part of the print data corresponding to one print sheet has been stored in the first spooler, they are sequentially read out.

In case of printing the document, the user selects items according to the feature of the document. By selecting those items, the printer driver 59 forms the print data having the corresponding information. For example, in case of printing the color image at the same picture quality as that of a photograph, a super photo is selected. In case of printing an ordinary document, a document is selected. Thus, desired print data is formed.

A method of printing a plurality of number of copies is performed by a column of setting the number of copies in 771 in FIG. 12. The document is copied by the number as many as only the number inputted in the column 771. A default numerical value is set to 1. By inputting a check mark into the item indicating that the print is performed copy by copy in 772, the print is performed on a copy unit basis when a plurality of copies are printed. Explanation will now be made hereinbelow while showing an example.

Order of forming print data in case of printing two copies from a document constructed by three pages.

When there is no check mark in 772:
the 1st page, 1st page, 2nd page, 2nd page, 3rd page, 3rd page When there is a check mark in 772:
the 1st page, 2nd page, 3rd page, 1st page, 2nd page, 3rd page For the print of the document formed by the application, it is classified into the following four cases by paying attention to the number of pages and the number of copies.

(1) one page . . . one copy (2) a plurality of pages . . . one copy (3) one page . . . a plurality of copies (4) a plurality of pages . . . a plurality of copies A method for printing so as not to disorder the page order in the case where the multi-printer print 78 is selected for each of the four classifications will now be described.

(1) One page . . . one copy

In this case, since only one page is printed, a disorder of the page order inherently does not occur. Therefore, the print is performed from the page of the smallest port number.

(2) A plurality of pages . . . one copy

EXAMPLE

It is now assumed that the total number of pages of the print data is equal to 100 and the number of usable printers is equal to 3.

$$100/3=33 \qquad 1$$

The print data of the first to 33rd pages is sent to the printer connected to USBPRNO1.

The print data of the 34th to 66th pages is sent to the printer connected to USBPRNO2.

The print data of the 67th to 100th pages is sent to the printer connected to USBPRNO3.

The above construction is a construction in the most general document. In this instance, when the print data is sequentially allocated every page to a plurality of printers, as will be also obviously understood because the first and second pages are printed by the different printers, if the printers to print are routinely allocated, the print is executed from each printer in a state where the page order is disordered. Therefore, in case of the mode of "a plurality of pages . . . one copy", the whole print data is once stored into the first spooler 60 and, after that, the total number of pages is divided from the first page so as to be equivalent for the usable printers. A block starting from the first page is sent to the printer connected to the port having the smallest port number. The next block is sent to the printer connected to the port having the next smallest port number. Processes similar to those mentioned above are repeated hereinbelow the number of times as many as only the number of usable printers. It is now assumed that all of the pages corresponding to a fraction (remainder) occurring when the total number of pages of the print data is divided by the usable printers are added to the final print data block. The above method will now be described hereinbelow.

Examples in such a case are shown below.

However, when the number of pages is smaller than the total number of printers which are used, the pages are allocated one by one to each printer and the print is performed.

(3) One page . . . a plurality of copies

All of the same contents are allocated to the usable printers, thereby printing. For this purpose, the number of copies is divided by the number of usable printers, the first block is sent to the printer connected to the port having the smallest port number, and the next block is sent to the printer connected to the port having the next smallest port number. The above operations are subsequently repeated by the number of times as many as only the number of printers in a manner similar to the above. It is now assumed that a fraction generated when the whole number of copies is divided by the number of printers is added to the final block.

(4) A plurality of pages . . . a plurality of copies (4-1) In the case where there is no check mark in the check box of the mode of "print copy by one" 772:

Each page starting from the first page is copied by the number as many as only the number of copies set in 771. A control is performed so as to send the copied pages as one block to the same printer.

As already described above, the print data is copied by the back grounder 61. Therefore, just after completion of the storage of the first page into the first spooler 60, the back grounder 61 starts the copying operation and can send the copied first page as one block to the multi printer controller 66. Similar operations are also performed to the second and subsequent pages.

Examples will be shown below.

In case of printing four copies of each of four pages by using three printers:

(step 1) Four copies of the print data of the first page is sent to the printer connected to USBPRNO1.

(step 2) Four copies of the print data of the second page is sent to the printer connected to USBPRNO2.

(step 3) Four copies of the print data of the third page is sent to the printer connected to USBPRNO3.

(step 4) Four copies of the print data of the fourth page is sent to the printer connected to USBPRNO4.

(4-2) In the case where there is a check mark in the check box of the mode of "print copy by one" 772:

Copies of each of the first to final pages are formed by the number of copies set in 771. Each copy is sent as one block on a block unit basis to the printer which is used for printing and is printed. After the final page was stored into the first spooler 60, the back grounder 61 starts the copying operation.

Examples will be shown below.

In case of printing four copies of each of four pages by using three printers:

(step 1) The print data of the first to fourth pages is sent to the printer connected to USBPRNO1.

(step 2) The print data of the first to fourth pages is sent to the printer connected to USBPRNO2.

(step 3) The print data of the first to fourth pages is sent to the printer connected to USBPRNO3.

(step 4) The print data of the first to fourth pages is sent to the printer connected to USBPRNO4.

Figure 13:
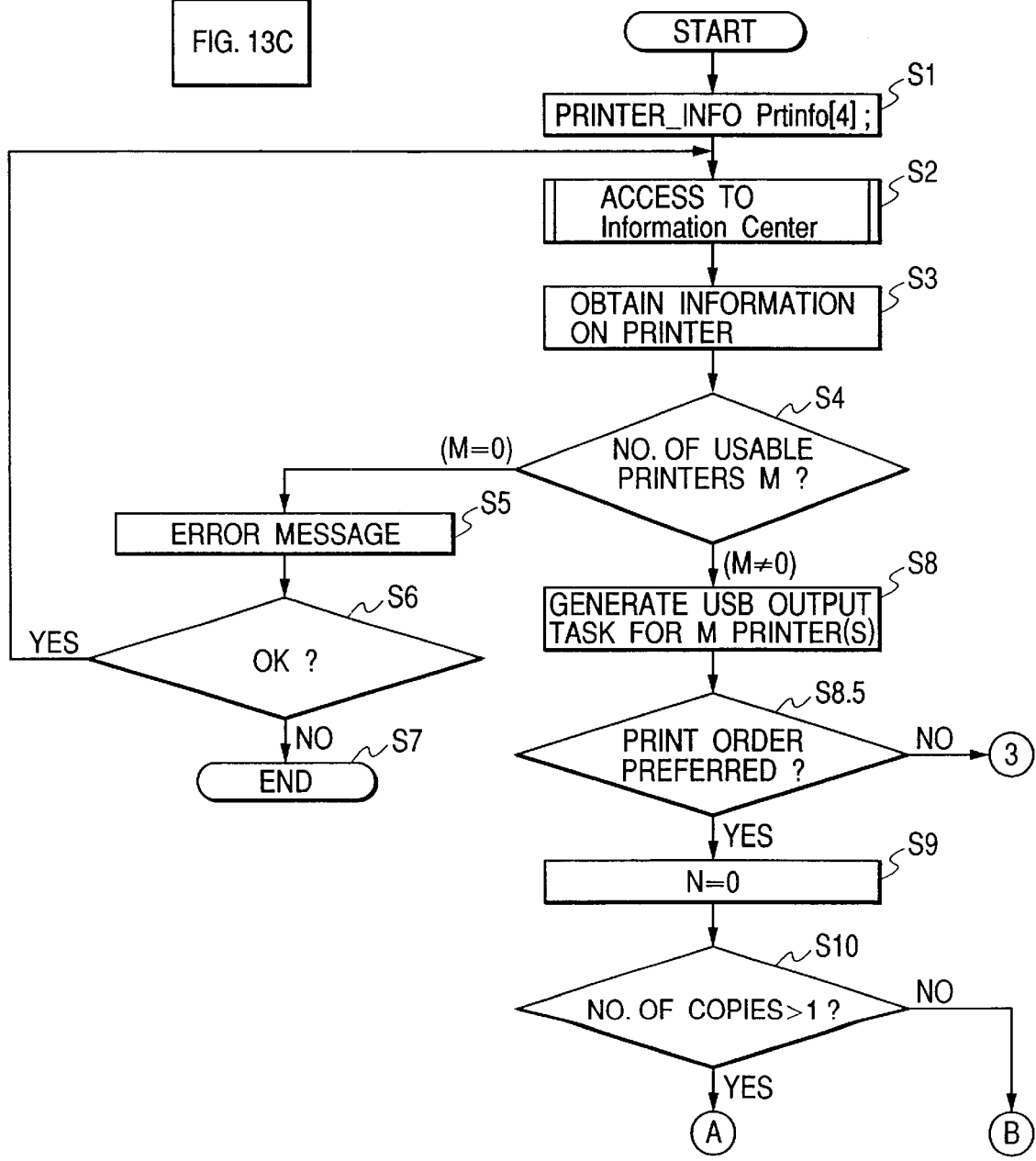
FIG. 13 composed of 13A, 13B and 13C is a diagram showing a flowchart for explaining an embodiment.
Figure 13B:
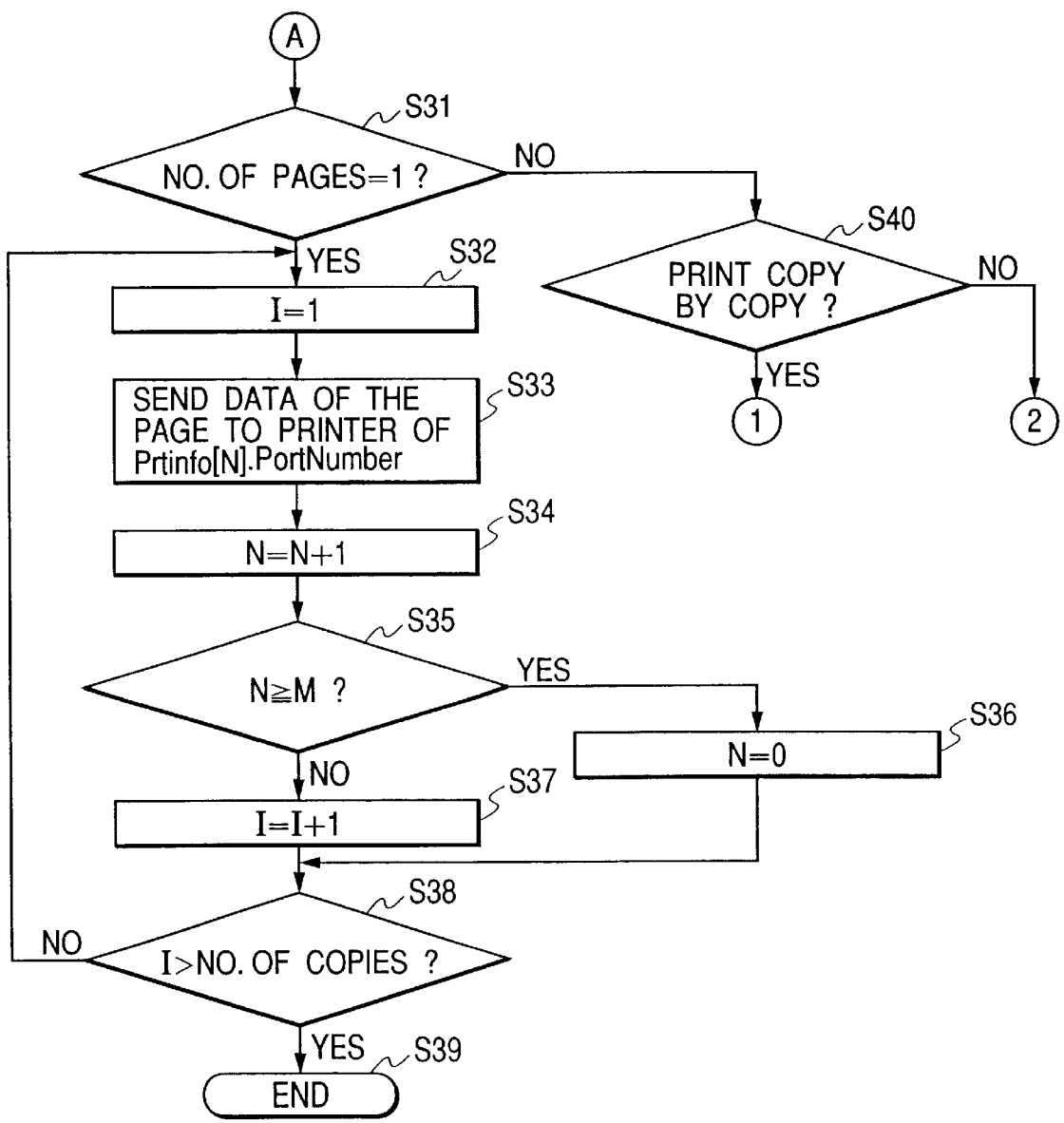
Figure 13C:
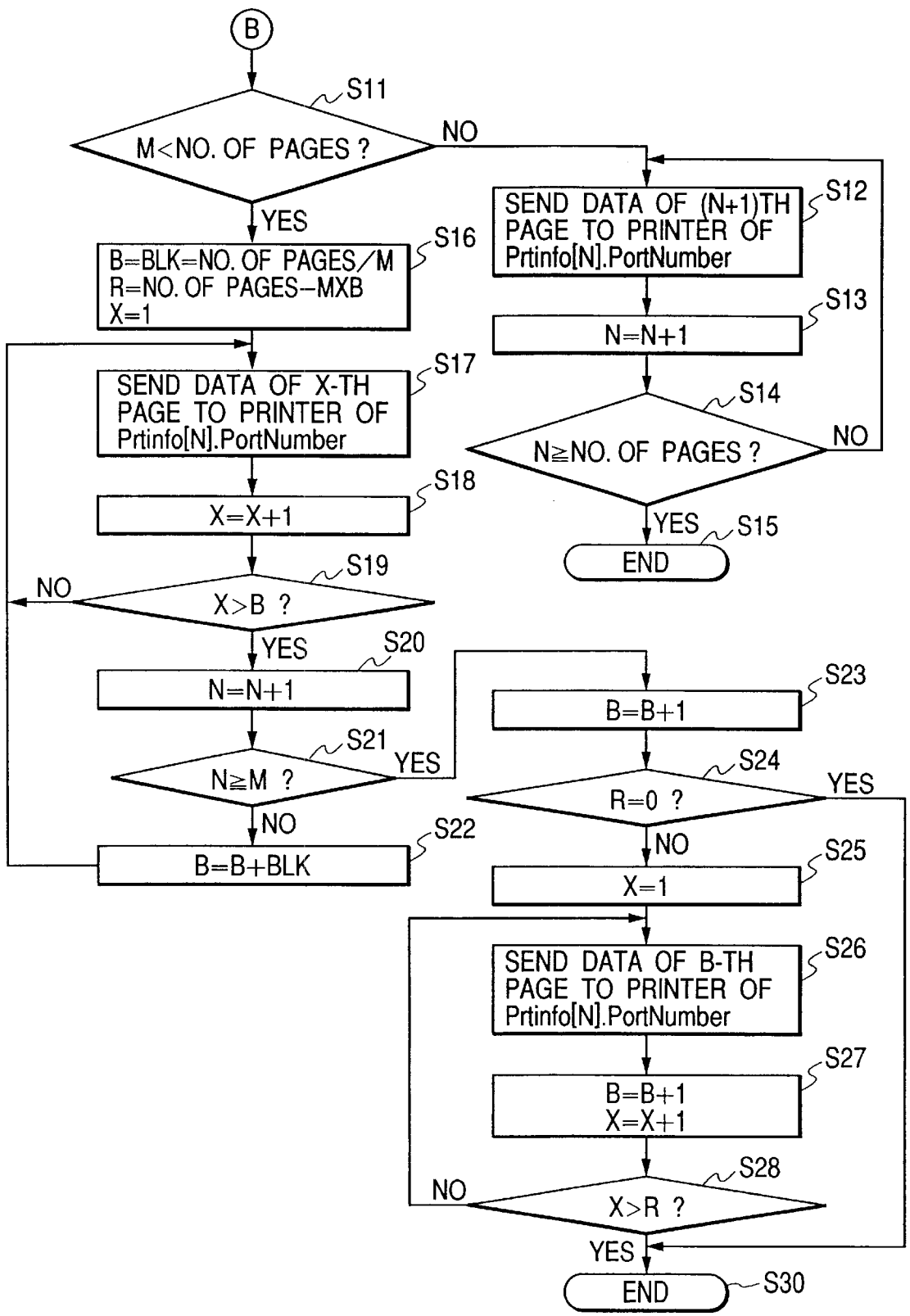
Figure 14:
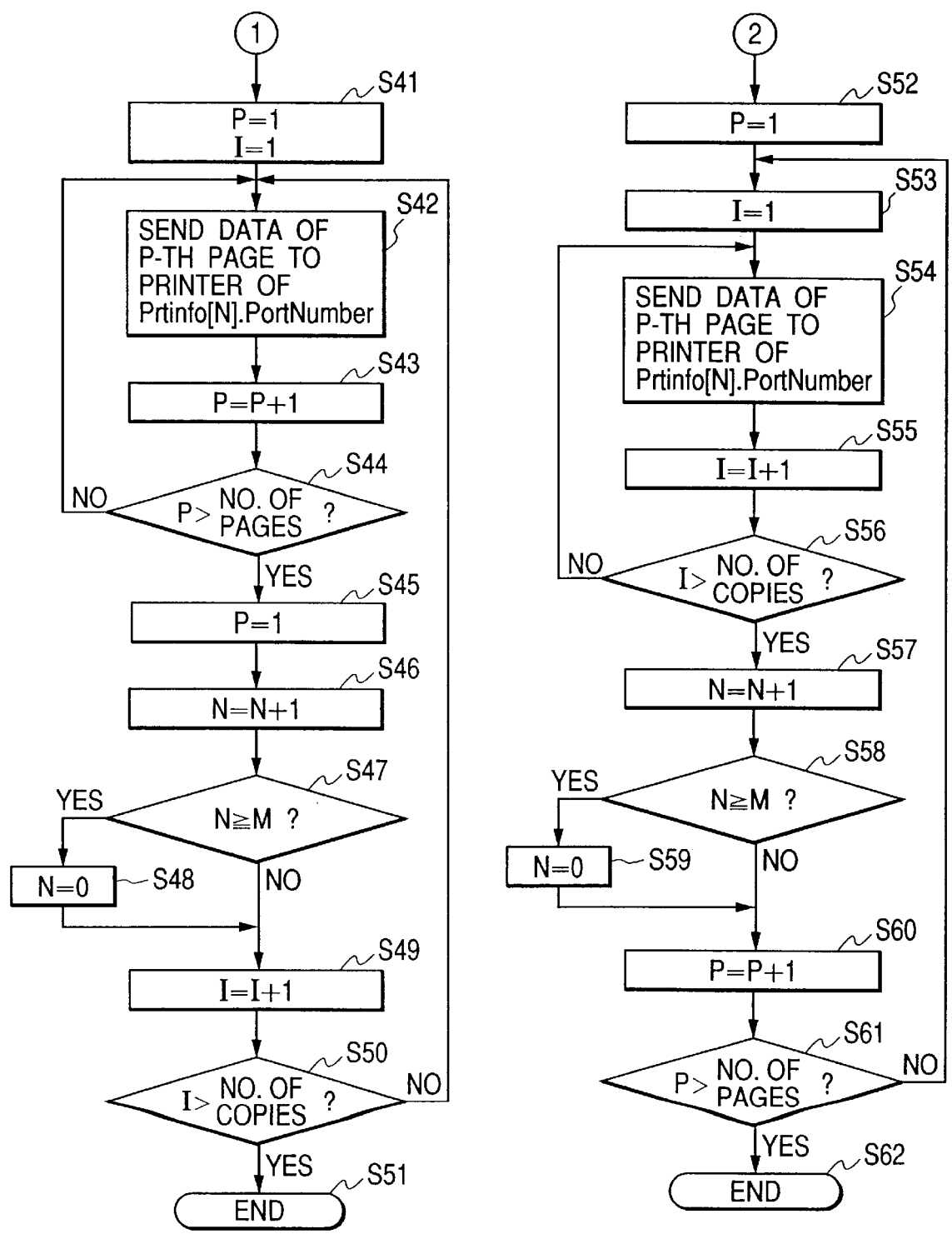
FIG. 14 is a diagram showing a flowchart for explaining the embodiment.

The processes in the portion of the multi printer controller 66 will be further described with reference to flowcharts of FIGS. 13 and 14.

It is assumed in the embodiment that the maximum number of connectable printers is equal to four. A printer information structure to store the information regarding each printer is shown below.

The printer information structure is expressed as follows.

```
typedef struct {
    int PortNumber ;
} PRINTER_INFO, *pPRINTER_INFO;
```

As for "PortNumber" as a member name of the structure, a numerical value indicative of the number of "1" or "2" of the port name such as USBPRNO1, USBPRNO2, or the like which has been named for convenience is stored.

By using this structure, an area as much as four printers is assured like "PRINTER_INFO PrtInfo [4]". When the Information Center is executed by using the start address (&PrtInfo) of the assured area as an input parameter in step S1, if there are the usable printers, the Information Center stores the information of these printers into the structure. The return value from the Information Center shows the number of usable printers.

As already been described, after the print data from the application 56 was once stored into the first spooler process 60, it is read out by the back grounder 61 and is sent to the multi printer controller 66. The multi printer controller is activated by the back grounder prior to actually transmitting the print data. When the print data is sent from the back grounder, an area to store the information of the printers connected in step S1 is assured. As already described above, the maximum number of connectable printers is four. In step S2, an access is performed to the Information Center and the information regarding the printers is obtained. In step S3, the information from the Information Center is stored into the printer information structure. As a return value, the Information Center returns the number of usable printers. The usable printer here denotes the printer which can print. For example, the usable printer does not correspond to the printer in which the power source is OFF and the printer in which some obstacle has occurred. The number of usable printers is stored into a variable M. If it is determined in step S4 that the usable printer does not exist (namely, M=0), an error message is displayed in step S5. The user can select either "OK" or "cancel". When it is determined in step S6 that "OK" has been clicked, the printer information is again obtained in step S2. Therefore, before "OK" is clicked, the user needs to eliminate causes because of which the printing cannot be started. When the obstacle cannot be removed, "cancel" can be also clicked. In this case, the processing routine advances to step S7 and the processes are finished.

In step S8, the USB output tasks 68 are formed by the number as many as only the number of usable printers. In step S8.5, a check is made to see if a "prefer print order" mode 773 in FIG. 12 has been designated. If YES in step S8.5, step S9 follows. In step S9, a parameter for control is initialized. "N" denotes a parameter to control the order of the printers which are used.

In step S10, the number of copies to be printed is discriminated. When it is equal to 1, step S11 follows. In step S11, a check is made to see if the total number of pages to be printed is larger than the number M of usable printers. When it is equal to or less than M, the print data is sent to the printers one page by one and the processes are finished. This portion corresponds to processes in steps S12 to S15.

When the number of pages is larger than the number of usable printers, in step S16, the total number of pages is divided by the number of printers and the number of pages which has to be printed per printer is stored into an area "BLK". The page number of the page to be printed is stored into "B". A remainder generated as a result of the division is stored into "R". In processes in steps S17 to S22, the print data divided every BLK pages is sent to the printers. In step S21, a check is made to see if the print data has been transmitted to the printer connected to the port having the largest port number among the usable printers. In this case, the print data of final remaining R pages is sent to the printer of the port with the largest port number in steps S23 to S30 and the processes are finished. Whether R=0 or not is discriminated in step S24. When R=0, the processes are finished without executing them.

In step S31, a check is made to see if the number of pages to be printed is equal to 1 although the number of copies is equal to a plural number. If it is equal to only 1, step S32 follows. In steps S32 to S39, a process for sequentially sending the print data of one page to each printer by only the designated number of copies is performed.

When it is decided in step S31 that the number of pages is larger than 1, step S40 follows and whether there is a check mark in 772 or not is discriminated. If YES, step S41 follows. If NO, step S52 follows. By processes in steps S41 to S51, the print data is printed copy by copy. By processes in steps S52 to S62, the print data is printed by a mode instead of copy by copy.

Figure 15:
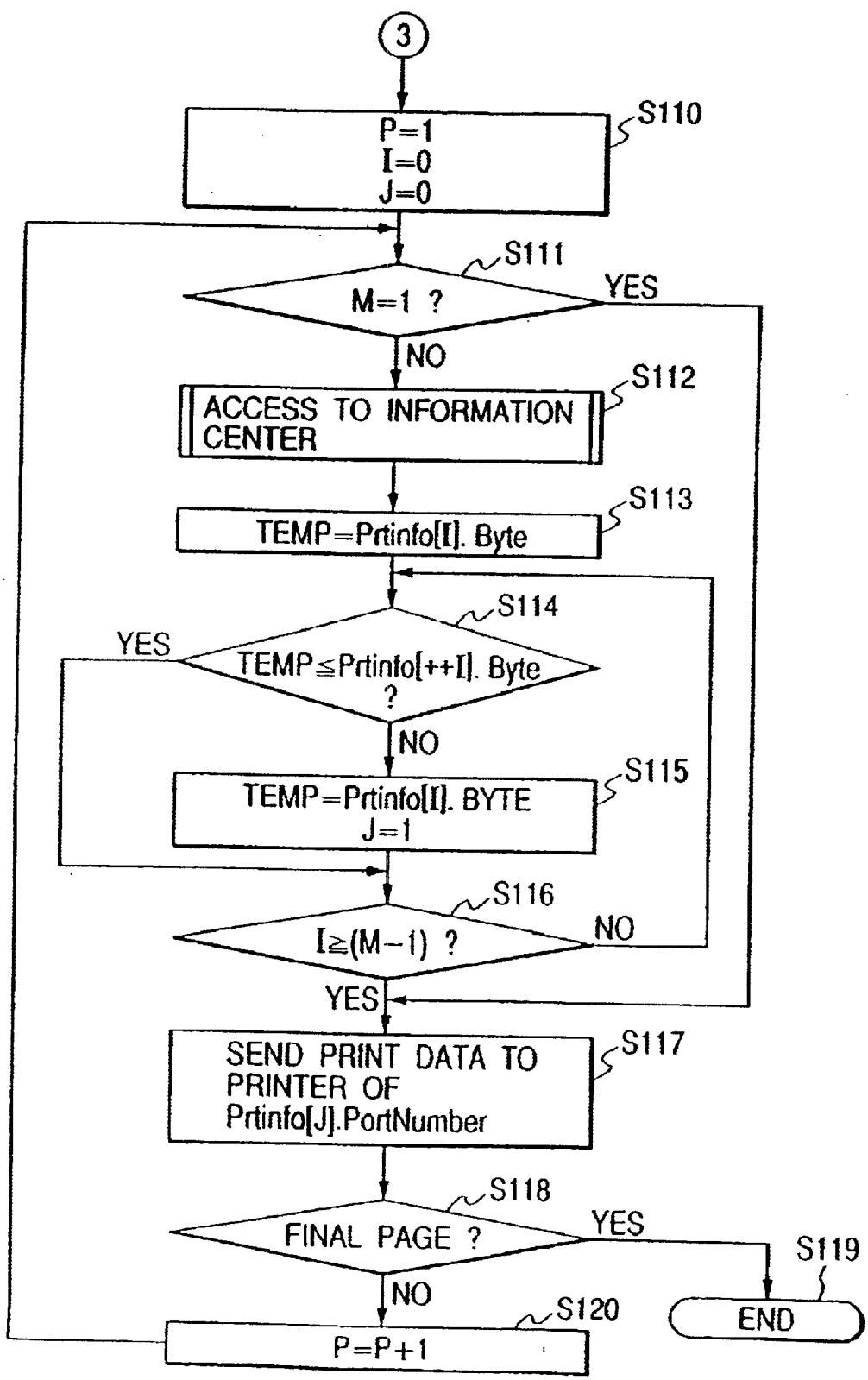
FIG. 15 is a diagram showing a flowchart for explaining the embodiment.

If NO in step S8.5, namely, when a "prefer print speed" mode 774 is selected in FIG. 12, the processing routine advances to step S110 in FIG. 15.

In step S110, the control parameter is initialized. P denotes a parameter to control the number of pages to be printed. I and J indicate control parameters to obtain the smallest number of bytes from the print data stored in the second spooler 65 in the subsequent processes. The number of usable printers is checked in step S111. When there is only one usable printer, since the print is performed by using only this single printer, there is no need to distribute the print data. Therefore, step S117 follows and the print data is transmitted to the relevant printer. In step S112, an access is again performed to the Information Center and the number of bytes of the print data stored in the second spooler 65 is obtained every printer from the spooler process 63. In steps S113 to S116, the smallest value is selected from "PrtInfo [I] .Byte". In step S117, the print data is sent to the printer having the smallest value. The print data sent in step S117 is stored into the second spooler 65 and is reflected to the number of bytes which is obtained by accessing to the Information Center in step S112 at the next time. A check is made in step S118 to see if the processing page is the final page. If it is the final page, the printing process is finished in step S119. If NO, the processing routine is returned to step S111 in order to print the next page in step S120.

According to the embodiment of the invention, attention is paid to the print speed of the ink jet printer and a problem on the print speed can be solved.

Specifically speaking, a plurality of ink jet printers are connected to one personal computer and are simultaneously used, so that a throughput of the print can be raised.

The printers which are used in the invention are printers using the USB (Universal Serial Bus) as an interface. The USB is a high speed serial bus having a transfer rate that is about 10 times as high as that of the conventional Centronics interface. It is a feature of the USB that a plurality of USB equipment can be cascade connected.

At present, the USB has been installed as a standard in a host personal computer and there is no need to add any special hardware.

(Hitherto, it is a general way to use a network in order to access to a plurality of printers. However, in this case, equipment for the personal computer to access to the network, equipment to connect the printers to the network, and the like are necessary. However, in case of the embodiment of the invention, since there is no need to add the equipment to access to the USB, the embodiment fundamentally differs from the case of using the network with respect to this point.

When the print is performed by simultaneously using a plurality of printers, the time that is required until the print is certainly completed is reduced as compared with that in the case where the single printer prints all pages. However, actually, if the printed results are rearranged in accordance with the page order and a plurality of copies are printed, the actual work is completed by performing the operation to bind every copies and the like. In the case where the pages to be printed are distributed to each printer so as to reduce the time during which the connected printers are operating as much as possible by using all of the connected printers, when one document having a plurality of pages is printed from a plurality of printers, there is also a situation such that the pages are printed without maintaining the page order. Thus, the user has to rearrange them and surplus work and time are required until the final printed matter is obtained.

That is, in case of making the most of the printing ability of only the connected printers, a whole throughput of the printers is improved. However, a total throughput until the final result is obtained from the start of the print is not improved. In the case where a plurality of printers are connected to one personal computer and the document formed by the application is printed, the invention can improve the foregoing total throughput.

According to the invention, in case of sending the print data to a plurality of printers, a method of distributing the print data to the printers can be changed in accordance with the number of pages of the print data, the number of copies, and the number of printers which are used to print.

In case of printing the document formed by the application, the printing mode can be classified to the following four modes by paying attention to the number of pages and the number of copies.

(1) one page . . . one copy (2) a plurality of pages . . . one copy (3) one page . . . a plurality of copies (4) a plurality of pages . . . a plurality of copies Among them, there are only the modes (1) and (3) in which even if the page order upon printing is disordered, no influence is exerted on the time and work until the final print result is obtained. In the modes (2) and (4), since the page order upon printing is disordered, a work to rearrange the page order is necessary.

According to the embodiment of the invention, by paying attention to the modes (2) and (4), means for deciding the printers which are used and the printing method in accordance with the number of usable printers and preventing the page order from being disordered can be further provided and means for reducing the time that is required until the completion of the print can be provided.

By those means, the problem about the print speed of the printer of the color ink jet system can be solved and the time that is required until the final print result is obtained can be reduced.

In a printer system in which a plurality of ink jet printers using a high speed serial bus as an interface which can be cascade connected are connected and the throughput of printing is improved by simultaneously using those plurality of printers, by changing the method of distributing the print data in accordance with the number of copies, the number of pages, and the number of printers which are determined to be usable, the print data can be printed without disordering the page order of the print result.

Consequently, the total throughput until the final print result is obtained from the application is improved and the problem such that the print speed of the printer of the ink jet system is slow can be solved.

Although the ink jet printers have been used in the embodiment, the invention can be also applied to printer drivers of the other print form such as laser beam printer, thermal printer, LED printer, and the like.

Although the USB has been used as a serial bus in the embodiment, the invention can be also realized by a serial bus such as IEEE 1394 or the like.

As described in detail above, according to the invention, an information processing apparatus, an information processing method, and a storage medium which enables a plurality of printers to print a document without disordering the page order can be provided.

An information processing apparatus, an information processing method, and a storage medium which enables a document to be printed in the "prefer print speed" mode or the "prefer page order" mode designated by the user can be provided.

What is claimed is:

1. An information processing apparatus for causing a plurality of printers to execute printing, said apparatus comprising:

a discriminating unit, arranged for discriminating whether a copy-by-copy print mode is designated for printing a designated number of copies of a document comprising pages from a first page to a final page copy by copy;

a first transmission unit, arranged for making the designated number of blocks of print data, each block comprising print data for one copy of the pages from the first page to the final page, and transmitting the blocks of print data to the respective different printers block by block, if said discrimination unit discriminates that a copy-by-copy print mode is designated; and a second transmission unit, arranged for making blocks of print data, each block comprising print data for the designated number of copies of a different one of the pages from the first page to the final page, and transmitting the blocks of print data to the respective different printers block by block, if said discrimination unit discriminates that a copy-by-copy print mode is not designated.

2. An apparatus according to claim 1, further comprising:

a determination unit, arranged for determining whether a prefer print order mode is designated; and a third transmission unit, arranged for transmitting the print data to one of the plurality of printers that is presumed to finish printing earliest if said determination unit determines that the prefer print order mode is not designated, wherein either one of said first and second transmission units transmits the print data to the printers in response to a discrimination made by said discrimination unit if said determination unit determines that the prefer print order mode is designated.

3. An apparatus according to claim 2, wherein said third transmission unit obtains an amount of print data stored in a spooler of each of the plurality of printers and transmits the print data to one of the printers that has a smallest amount of print data.

4. An apparatus according to claim 1, wherein the plurality of printers are cascade connected.

5. An apparatus according to claim 1, further comprising the plurality of printers.

6. An information processing method of causing a plurality of printers to execute printing, said apparatus comprising:

a discrimination step of discriminating whether a copy-by-copy print mode is designated for printing a designated number of copies of a document comprising pages from a first page to a final page copy by copy;

a first transmission step of making the designated number of blocks of print data, each block comprising print data for one copy of the pages from the first page to the final page, and transmitting the blocks of print data to the respective different printers block by block, if said discrimination step discriminates that a copy-by-copy print mode is designated; and a second transmission step of making blocks of print data, each block comprising print data for the designated number of copies of a different one of the pages from the first page to the final page, and transmitting the blocks of print data to the respective different printers block by block, if said discrimination step discriminates that a copy-by-copy print mode is not designated.

7. A method according to claim 6, further comprising:

a determination step of determining whether a prefer print order mode is designated; and a third transmission step of transmitting the print data to one of the plurality of printers that is presumed to finish printing earliest if said determination step determines that the prefer print order mode is not designated, wherein either one of said first and second transmission steps transmits the print data to the printers in response to a discrimination made in said discrimination step if said determination step determines that the prefer print order mode is designated.

8. A method according to claim 7, wherein said third transmission step obtains an amount of print data stored in a spooler of each of the plurality of printers and transmits the print data to one of the printers that has a smallest amount of print data.

9. A method according to claim 6, wherein the plurality of printers are cascade connected.

10. A method according to claim 6, wherein said method is executed through a printer driver.

11. A computer-readable storage medium which stores a computer program executed in an information processing apparatus for causing a plurality of printers to execute printing, said program comprising:

a discrimination step of discriminating whether a copy-by-copy print mode is designated for printing a designated number of copies of a document comprising pages from a first page to a final page copy by copy;

a first transmission step of making the designated number of blocks of print data, each block comprising print data for one copy of the pages from the first page to the final page, and transmitting the blocks of print data to the respective different printers block by block, if said discrimination step discriminates that a copy-by-copy print mode is designated; and a second transmission step of making blocks of print data, each block comprising print data for the designated number of copies of a different one of the pages from the first page to the final page, and transmitting the blocks of print data to the respective different printers block by block, if said discrimination step discriminates that a copy-by-copy print mode is not designated.

12. A storage medium according to claim 11, wherein said program further comprises:

a determination step of determining whether a prefer print order mode is designated; and a third transmission step of transmitting the print data to one of the plurality of printers that is presumed to finish printing earliest if said determination step determines that the prefer print order mode is not designated, wherein either one of said first and second transmission steps transmits the print data to the printers in response to a discrimination made in said discrimination step if said determination step determines that the prefer print order is designated.

13. A storage medium according to claim 12, wherein said third transmission step obtains an amount of print data stored in a spooler of each of the plurality of printers and transmits the print data to one of the printers that has a smallest amount of print data.

14. A storage medium according to claim 11, wherein the plurality of printers are cascade connected.

15. A storage medium according to claim 11, wherein the program is a printer driver.

16. A computer program executed in an information processing apparatus for causing a plurality of printers to execute printing, said program comprising:

a discrimination step of discriminating whether a copy-by-copy print mode is designated for printing a designated number of copies of a document comprising pages from a first page to a final page copy by copy;

a first transmission step of making the designated number of blocks of print data, each block comprising print data for one copy of the pages from the first page to the final page, and transmitting the blocks of print data to the respective different printers block by block, if said discrimination step discriminates that a copy-by-copy print mode is designated; and a second transmission step of making blocks of print data, each block comprising print data for the designated number of copies of a different one of the pages from the first page to the final page, and transmitting the blocks of print data to the respective different printers block by block, if said discrimination step discriminates that a copy-by-copy print mode is not designated.

17. A program according to claim 16, wherein said program further comprises:

a determination step of determining whether a prefer print order mode is designated; and a third transmission step of transmitting the print data to one of the plurality of printers that is presumed to finish printing earliest if said determination step determines that the prefer print order mode is not designated, wherein either one of said first and second transmission steps transmits the print data to the printers in response to a discrimination made in said discrimination step if said determination step determines that the prefer print order mode is designated.

18. A program according to claim 17, wherein said third transmission step obtains an amount of print data stored in a spooler of each of the plurality of printers and transits the print data to one of the printers that has a smallest amount of print data.

19. A program according to claim 16, wherein the plurality of printers are cascade connected.

20. A program according to claim 16, wherein said program is a printer driver.

* * * * *